United States Patent [19]

Cushing et al.

[11] Patent Number: 4,467,416
[45] Date of Patent: Aug. 21, 1984

[54] LOGIC TRANSFER AND DECODING SYSTEM

[75] Inventors: David E. Cushing, Chelmsford; Richard A. Lemay, Carlisle; Philip E. Stanley, Westboro; William E. Woods, Natick, all of Mass.

[73] Assignee: Honeywell Information Systems Inc., Waltham, Mass.

[21] Appl. No.: 302,898

[22] Filed: Sep. 16, 1981

[51] Int. Cl.³ .............................................. G06F 7/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,135,242 | 1/1979 | Ward et al. | 364/200 |
| 4,246,644 | 1/1981 | Flynn et al. | 364/900 |
| 4,312,036 | 1/1982 | Porter et al. | 364/200 |
| 4,322,795 | 3/1982 | Lange et al. | 364/200 |
| 4,348,724 | 9/1982 | Cushing et al. | 364/200 |
| 4,354,232 | 10/1982 | Ryan | 364/200 |
| 4,360,869 | 11/1982 | Stanley et al. | 364/200 |
| 4,382,278 | 5/1983 | Appelt | 364/200 |

Primary Examiner—Jerry Smith
Assistant Examiner—Gary V. Harkcom
Attorney, Agent, or Firm—George Grayson; Nicholas Prasinos

[57] ABSTRACT

A logic control system is disclosed for accommodating the flow of both procedural information and CPU (central processing unit) instructions from a central memory system to a CPU without compromising memory bandwidths or CPU execution speeds because of transfer delays or timing variances. Instruction modifications and plural task assignments are accommodated during instruction execution.

4 Claims, 3 Drawing Figures

LOGIC TRANSFER AND DECODING SYSTEM

RELATED APPLICATIONS

The following U.S. patent applications filed on an even date with the instant application and assigned to the same assignee as the instant application are related to the instant application and are incorporated herein by reference.

1. "Logic Control System for Efficient Memory to CPU Transfers" by David E. Cushing, Richard A. Lemay, Philip E. Stanley and William E. Woods, having U.S. Ser. No. 302,902 and filed on Sept. 16, 1981.

2. "Logic Control System Including Cache Memory for CPU-Memory Transfers" by Richard A. Lemay, Philip E. Stanley, William E. Woods and David E. Cushing, having U.S. Ser. No. 302,904 and filed on Sept. 16, 1981.

3. "Instruction Decoding Logic System" by Philip E. Stanley, William E. Woods and Richard A. Lemay, having U.S. Ser. No. 302,897 and filed on Sept. 16, 1981.

4. "Flexible Logic Transfer and Instruction Decoding System" by William E. Woods, David E. Cushing, Richard A. Lemay and Philip E. Stanley, having U.S. Ser. No. 302,903 and filed on Sept. 16, 1981.

BACKGROUND OF THE INVENTION

1. FIELD OF THE INVENTION

The invention relates to a logic control system for providing to a CPU (central processing unit) both instructions and procedural information such as constants, displacements, and addresses stored in a memory system, and more particularly to a logic control system which may accommodate the transfer of information to the CPU without compromising memory system bandwidths or CPU execution speeds, and which further may accomodate the modification of CPU instructions during instruction execution.

2. PRIOR ART

In logic control systems heretofore used in data processing systems, CPU (central processing unit) requests for instructions and procedural information stored in a central memory system incur transfer delays causing the CPU to enter into idle states awaiting either new instructions or procedural information required during the execution of an instruction. More particularly, a logic control system typically is initialized by the CPU to request a bus cycle from a communication bus to which the central memory system is attached. Upon acquiring the bus cycle, the logic control system requests and receives instructions and procedural information such as constants, displacements and addresses from the memory system. Upon the CPU receiving such information from the logic control system, the CPU executes the instructions with reference to the procedural information. The CPU execution speed thus is dependent not only upon internal execution speeds but also upon the information transfer rate between the memory system and the CPU.

The transfer delays have been partially ameliorated by logic systems accommodating block transfers from the central memory system to directly accessible memory systems such as a cache memory system. Please refer to U.S. patent application Ser. No. 221,854 now U.S. Pat. No. 4,424,561 entitled "Odd/Even Bank Structure For A Cache Memory" which is assigned to the assignee of the present invention, and which particularly describes the structure and operation of a cache memory system. The CPU execution speeds, however, still have been limited to an undesirable extent by the transfer delays between the cache memory system and the CPU.

Further deficiencies in prior logic control systems have been the lack of flexibility in performing tasks other than information transfer tasks in providing instructions to the CPU, and the inability to overcome timing variances incurred in transferring instructions to the CPU while accommodating instruction modification during instruction execution.

In the present invention, a hardware/firmware logic control system is provided which accommodates the transfer of not only procedural information but also CPU instructions from a memory system to a CPU at a rate sufficiently high to avoid compromises of either memory bandwidths or CPU execution speeds caused by information transfer delays, and which further accommodates the modification of CPU instructions during instruction execution and the use of logic devices for tasks other than the transfer of information during instruction execution without incurring timing variances in providing the instructions to the CPU.

SUMMARY OF THE INVENTION

The invention is directed to an efficient and flexible hardware/firmware logic control system for providing procedural and instruction words stored in a central memory system to a central processing unit (CPU) at rates compatible with memory system bandwidths and the execution speeds of the CPU.

More particularly, the logic control system communicates with the central memory system by way of a system communication bus supporting other system devices, while the CPU and the logic control system communicates by way of a local communication bus. The CPU thereby is isolated from transfer delays incurred in communicating with the central memory system by way of the system bus. In the alternative, CPU requests for information from central memory may be forwarded by the logic control system through a cache memory system to the central memory system. If the requested information is stored in the cache memory system, the cache memory system honors the request without forwarding the request to the central memory system. If the requested information is not stored in the cache memory system, however, the request is forwarded by the cache memory system to the system bus, and the information received from the central memory system is both stored in the cache memory system and placed on the local communication bus for use by the logic control system in providing the information to the CPU.

The logic control system includes a decoding logic system for decoding instruction words received from either the cache memory system or the central memory system without incurring transfer delays caused by timing variances incurred in transferring an instruction through the decoding logic system. The decoding logic system further accommodates continued access to the operation code of an instruction without interfering with operand bit modifications which are accomplished by incrementation, decrementation, and the substitution of memory bits or CPU computed values in the operand fields of the instruction.

In one aspect of the invention, the operation code of a CPU instruction is stored in an operation code register of the decoding logic system, while operand bits of the instruction are stored in counters. Each of the counters may received information from either memory or the CPU under firmware control to accommodate the modification of the operand bits of the instruction during instruction execution by the substitution of stored and computed values, or by the incrementation or decrementation of the operand bits.

In another aspect of the invention, CPU instructions are decoded through the use of a bidirectional tristate feedback data path in an operation code register of the decoding logic system to provide instantaneous access by the CPU to operation code bits presented to the decoding logic system, and continued access to the operation code by firmware without interfering with the use of operand bits for other purposes.

In a further aspect of the invention, the logic control system upon being initialized by the CPU issues requests for information to be transferred from the central memory system to an intermediate memory unit of the transfer control logic, and initiates the loading of information from the intermediate memory into selected ones of plural input registers of the logic control system, upon the incipiency of an accessing of a remaining one of said plural input registers by the CPU. A time lead over the CPU access rate thereby is established in which at least a single word is available in the plural input registers for future use by the CPU at all times.

In still a further aspect of the invention, both single input register and input register pair selections may be made to accommodate single word and double word transfers to the CPU. Procedural information is separated from instruction words and provided to the CPU along independent information paths.

DESCRIPTION OF THE DRAWINGS

For a more complete understanding of the present invention, and for further advantages and objects thereof, reference may now be had to the following description taken in conjunction with the accompanying drawings in which.

DESCRIPTION OF THE PREFERRED EMBODIMENTS

Figure 1:
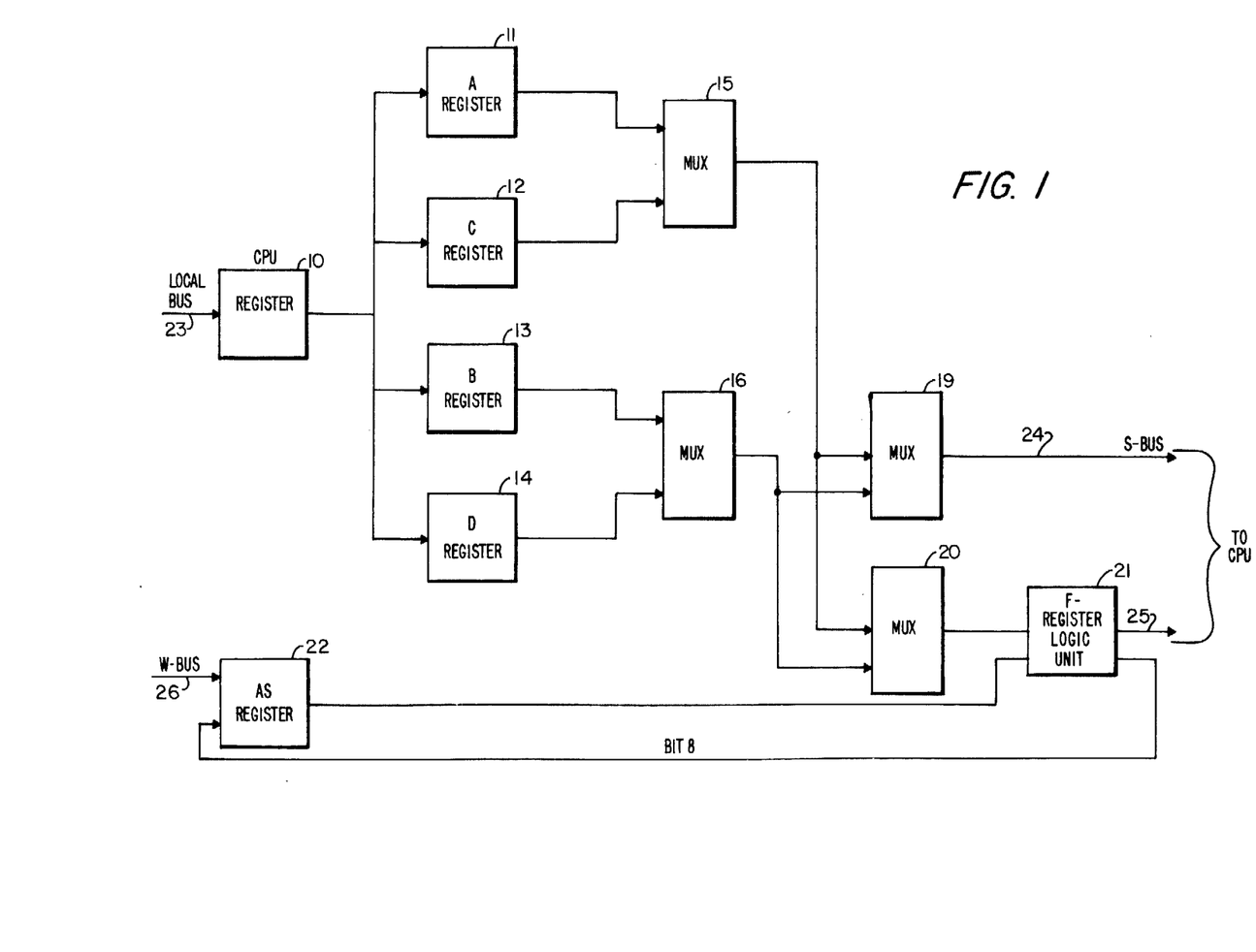
FIG. 1 is a functional block diagram of a logic control system embodying the invention.

FIG. 1

FIG. 1 illustrates in functional block diagram form a logic control system comprising a thirty-two bit CPU (central processing unit) register 10, sixteen bit resgisters having reference numbers 11-14, respectively, multiplexers 15 and 16, multiplexers 19 and 20, an F-register logic unit 21 and an eight bit register referred to as an AS register 22.

The CPU register 10 receives instruction words and procedural information from a memory system by way of a local communication bus 23. It is to be understood that the memory system may be a central memory system or a cache memory system refreshed from the central memory system as shall be later described. The cache memory system may be of the type disclosed in U.S. application Ser. No. 221,854 now U.S. Pat. No. 4,424,561 entitled, "Odd/Even Bank Structure For A Cache Memory", which is assigned to the assignee of the present invention.

The invention disclosed herein is comprised of the logic control system of FIG. 1.

The output of the register 10 is applied to the inputs of registers 11-14. The output of register 11 is applied to one input of multiplexer 15, and the output of register 12 is applied to a second input of multiplexer 15. The output of register 13 is applied to a first input of multiplexer 16, and the output of register 14 is applied to a second input of multiplexer 16. The outputs of multiplexers 15 and 16 are applied by way of a multiplexer 19 to a control bus 24 to supply procedural information such as constants, displacements, and addresses to the CPU. The outputs of multiplexers 15 and 16 further are applied by way of the multiplexer 20 to the F-register logic unit 21, which decodes computer instuctions for use by the CPU. The logic unit 21 in turn supplies sixteen bits of information by way of a control bus 25 to the CPU. Such information is used by the CPU to control the selection of firmware algorithms, operand registers, index registers and base registers required in the execution of an instruction. The output of logic unit 21 further supplies to the CPU procedural constants and other control information derived from an instruction word. A single bit, bit 8 of the output of logic unit 21, is supplied to the register 22. The register 22 further receives seven bits of information from the CPU by way of a control bus 26. The eight bit output of the register 22 is applied to a second input of the F-register logic unit 21.

In operation, the CPU requests information from a memory system by initializing the logic control system as shall be more particularly described. Such information includes both the instruction words and procedural information which is loaded into the register 10 under CPU control. The output of the register 10 is applied to the registers 11-14, and loaded into either registers 11 and 13, or registers 12 and 14 as shall be more particularly described. If, by way of example, the information is loaded into registers 11 and 13, the registers collectively shall contain a full 32 bit double word.

The multiplexers 19 and 20 independently may be caused to select between the outputs of multiplexers 15 and 16. The output of multiplexer 15 may reflect the output of either the register 11 or the register 12, and the output of the multiplexer 16 may reflect the output of either the register 13 or the register 14. The outputs of the registers 11-14 in turn are enabled in the sequence 11, 13, 12, 14, 11, 13, . . . , beginning with register 11. As the register 11 is being read, the registers 12 and 14 may be loaded with a next occurring double word. As the contents of register 12 are being read, the registers 11 and 13 may be loaded with a third or next occurring double word. The logic system of FIG. 1, therefore, provides a means for looking ahead on a statistical average of approximately one and one-half words in supplying both CPU instructions and procedural information to the CPU at a rate compatible with both the memory system bandwidth and the CPU execution speeds.

When the CPU requires the addressing of internal registers by CPU computed addresses rather than by the procedural addresses received from the registers 11-14, the CPU issues instruction field variations to the register 22 by way of the control bus 26. The right-most 8 bits of the information received by the F-register logic unit 21 from the registers 11-14 thereby may be replaced with the CPU field variations stored in the register 22.

Figure 2:
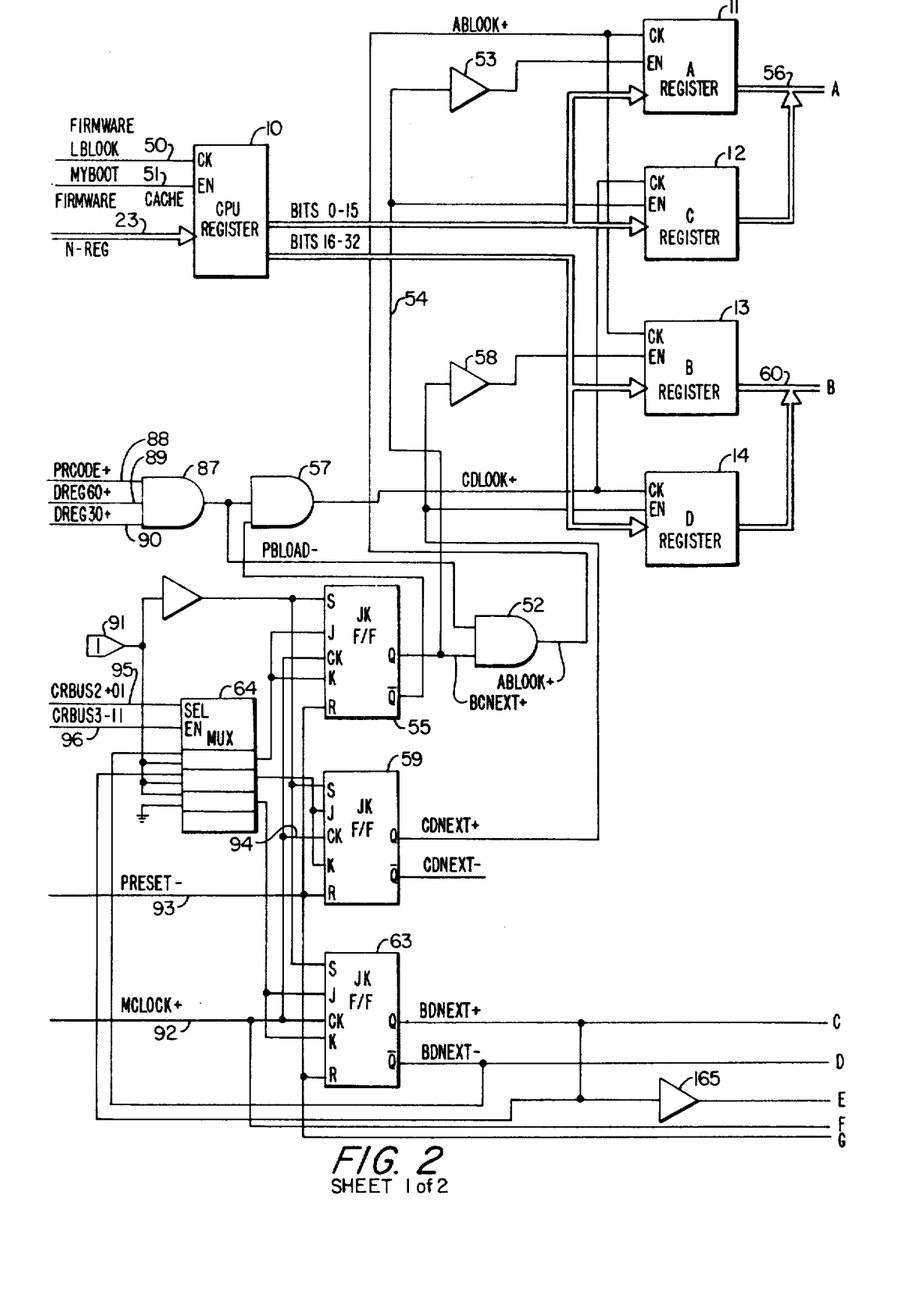
FIG. 2 is a detailed logic diagram of the logic control system of FIG. 1.

FIG. 2

FIG. 2 discloses in detailed logic diagram form the logic control system of FIG. 1.

Referring to FIG. 2, the CPU register 10 receives a clock signal by way of a control line 50 and an output enable signal by way of a control line 51. Each of the lines lead from an output of a firmware control system comprising part of the CPU. The CPU register 10 also receives thirty-two bits from a memory system by way of a local communication bus 23. Output bits 0-15 of the register 10 are applied to the data inputs of registers 11 and 12. Output bits 16-31 of the register 10 are applied to the data inputs of registers 13 and 14.

The clock input to register 11 is connected to the clock input of register 13 and to the output of an AND gate 52. The output-enable input to register 11 is connected to the output of an inverter 53, the input to which is connected to the output-enable input of register 12. The input to inverter 53 further is connected by way of a control line 54 to one input of gate 52 and to the Q output of a J/K flip-flop 55. The output of register 11 is connected to a tristate bus 56 leading to the output of register 12 and to first inputs of multiplexers 19 and 20.

The clock input of register 12 is connected to the clock input of register 14 and to the output of an AND gate 57. The output-enable input to register 13 is connected to the output of an inverter 58, the input of which is connected to the output-enable input of register 14 and to the Q output of a J/K flip-flop 59. The output of register 13 is connected to a tristate bus 60, which in turn is connected to the output of register 14 and to second inputs of multiplexers 19 and 20.

It is to be understood that in comparing FIGS. 1 and 2 the functionality of multiplexers 15 and 16 in FIG. 1 is provided by the tristate buses 56 and 60 and the logic output-enable control of registers 11-14 in FIG. 2.

The select input to multiplexer 19 is connected to a control line 61, and the enable input of the multiplexer is connected to a control line 62 leading to an output of the firmware control system. The output of multiplexer 19 supplies bits 0-31 of the control bus 24 to the source bus of the CPU.

The select input to multiplexer 20 is connected to the Q output of a J/K flip-flop 63 and to a first input of the second stage of a four-stage multiplexer 64. The enable input to the multiplexer 20 is connected to a control line 65 leading from an output of the firmware control system, and also is connected to the output-enable input of an eight bit register 66. Output bits 0-7 of the multiplexer 20 are applied by way of a tristate bus 100 to the data input of register 66, and output bits 8-15 of the multiplexer are applied to a tristate bus 67 connected to the output of register 22 and to the data inputs of two four-bit counters 68 and 69.

The clock input to the register 66 is connected to the clock input of a D-type flip-flop 70 and to a control line 71 leading to an output of the firmware control system. The output of the register 66 is applied to an eight bit tristate control bus 72 leading to the CPU, and to an eight bit bidirectional tristate feedback bus 101 connected to the data input of the register 66.

In the preferred embodiment disclosed herein, register 66 is an eight-stage register comprised of two integrated circuit chips, wherein each chip includes a four-stage register with each stage having both a tristate and a standard output. The register may be of the type manufactured and sold by Advanced Micro Devices of Sunnyvale, Calif., and represented to the public as register Model No. 2918.

The set input of the flip-flop 70 is connected by way of an inverter to a logic one source 73, to the reset input of the flip-flop and to the decrement input of the counter 68. The D input to the flip-flop 70 is connected to the bit 8 line of the tristate bus 67. The Q output of the flip-flop 70 is connected to one data input of the register 22 and to a control line 74 leading to the CPU.

The register 22 receives a clock input on a control line 75 leading from an output of the firmware control system. The output-enable input of the register is connected to a control line 76 also leading from an output of the firmware control system. As before stated, the register 22 in addition receives seven bits of information from the CPU by way of a control bus 26. The eight bit output of the register 22 is applied by way of the tristate bus 67 to the data inputs of counters 68 and 69.

The clock input to the counter 68 is connected to a control line 77 leading from an output of the firmware control system, and the load input to the counter is connected to a control line 78 leading from an output of the firmware control system. A second data input to the counter 68 is provided by way of a control line 79 leading from a further output of the firmware control system. The four bit output of the counter 68 is applied by way of a control bus 80 to the CPU.

The clock input to the counter 69 is supplied on a control line 82 by the firmware control system, and the load and decrement inputs to the counter are supplied on control lines 83 and 84, respectively, by the firmware control system. The four bit output of the counter is applied by way of a control cable 85 to the CPU.

The second input to AND gate 52 is connected to the output of an AND 87 and to one input of the gate 57. The gate 87 receives three inputs from the firmware control system on control lines 88-90, respectively. A second input to the gate 57 is connected to the Q complement output of the flip-flop 55.

The set input to the flip-flop 55 is connected by way of an inverter to a logic one source 91 and to the set inputs of flip-flops 59 and 63. The J and K inputs of the flip-flop 55 are connected to the output of the first stage of the multiplexer 64. The clock input to the flip-flop 55 is connected to the clock inputs of the flip-flops 59 and 63, and to a control line 92 leading to an output of the firmware control system. The reset input to the flip-flop 55 is connected to the reset inputs of the flip-flops 59 and 63, and to a control line 93 leading to an output of the firmware control system. The J and K inputs to the flip-flop 59 are connected to the output of the second stage of the multiplexer 64.

The J and K inputs to the flip-flop 63 are connected to the output of the third stage of multiplexer 64. The Q complement output of the flip-flop 63 is applied to the first input of the first stage of multiplexer 64. The second input to the first stage of the multiplexer is connected to the second input of the second stage, to the first input of the third stage and to the logic one source 91. The second input to the third stage of the multiplexer 64 is connected to ground. The select input to the multiplexer 64 is supplied by the firmware control system by way of a control line 95, and the enable input to the multiplexer is supplied by the firmware control system by way of a control line 96.

The Q output of flip-flop 63 further is connected to one input of an EXCLUSIVE OR gate 97, and the Q complement output of the flip-flop is connected to one input of an EXCLUSIVE OR gate 98. Second inputs of gates 97 and 98 are each connected to a control line 99 leading to an output of the firmware control system.

The output of gate 97 is applied to the J input of a J/K flip-flop 102, and the output of gate 98 is applied to the K input of the flip-flop. The set input of flip-flop 102 is connected to a logic zero source 103, and the clock input of the flip-flop is connected to control line 92. The reset input to flip-flop 102 is connected by way of a control line 104 to control line 93. The Q output of the flip-flop is connected to control line 61 leading to the select input of the multiplexer 19.

The Q output of flip-flop 63 in addition is connected by way of an inverter 105 to one input of an AND gate 106, the second input of which is connected to a control line 107 leading to an output of the firmware control system. The output of gate 106 is applied to one input of an OR gate 108, the second input of which is connected to a control line 109 leading to an output of the firmware control system. The output of gate 108 is applied to the D input of a D-type flip-flop 110.

The clock input to the flip-flop 110 is connected by way of a control line 111 to control line 92, and the clear input to the flip-flop is connected to a control line 112 leading to an output of the firmware control system. The Q output of the flip-flop is applied to a control line 113 leading to an input of the cache memory system.

DESCRIPTION OF OPERATION

In the operation of the logic control system of FIG. 2, the system is initialized by the occurrence of a logic one signal on line 93 under firmware control. More particularly, flip-flops 55, 59, 63 and 102 are reset to cause the Q outputs of the flip-flops to transition to a logic zero level. Registers 11 and 13 thereby are enabled, while registers 12 and 14 are disabled. In addition, the multiplexers 19 and 20 are caused to select the tristate bus 56. The logic control system at this point is readied to begin transferring information into registers 11 and 13.

Procedural information and instruction words are received from the cache memory system or the central memory system by way of the local communication bus 23. Under firmware control, the register 10 is enabled by a logic one signal on line 51 and is loaded during the occurrence of a logic one signal on line 50. Bits 0-15 of the register 10 output are applied to the inputs of registers 11 and 12, and bits 16-31 of the register 10 output are applied to the inputs of registers 13 and 14.

The loading of the registers 11-14 is controlled by AND gates 52 and 57, the enablement of which is under the control of AND gates 87 and flip-flop 55. The flips-flops 55 and 59 collectively control the selection of those of the registers 11-14 from which information shall be read for input to the control bus 24 and the logic unit 21. The flip-flop 63 acts to cause the multiplexer 20 to select between tristate buses 56 and 60. The flip-flop 63, gates 97 and 98, and flip-flop 102 act in concert to cause the multiplexer 19 to select between the tristate buses.

More particularly, the gate 87 receives three control signals from the firmware control system on lines 88-90. The line 88 upon transitioning to a logic one level indicates that either computer instructions or procedural information next shall be loaded into the register 10. The lines 89 and 90 carry aperiodic timing control signals which are caused to transition to a logic one level to effect a transfer of information from register 10 to the registers 11-14.

When the output of gate 87 and the Q output of flip-flop 55 are each at a logic one level, the output of gate 52 transitions to a logic one level to load information from the register 10 into the registers 11 and 13. When the output of gate 87 and the Q complement output of flip-flop 55 are each at a logic one level, the output of gate 57 transitions to a logic one level to load information from the register 10 into the registers 12 and 14.

As before stated, the flip-flops 55 and 59 control the order in which information stored in the registers 11-14 is read. During any read cycle, the registers 11-14 may be selected individually or in pairs, but are always read sequentially in accordance with the following register order: 11, 13, 12, 14, 11, 13, . . . . A single sixteen bit word may be stored in any of the registers 11-14, and double words may be stored in the following register pairs: 11 and 13, 13 and 12, 12 and 14, and 14 and 11.

By way of example, the multiplexer 19 may be caused to select a single word from register 11 followed by a double word from registers 13 and 12 for output to the control bus 24. In like manner, a single word may be selected from register 13 followed by a double word from registers 12 and 14. Thus single and double words may be read in any combination as long as the registers selected are read in the indicated order.

The particular selection indicated by the outputs of the flip-flops 55, 59 and 63 is controlled by the multiplexer 64 which in turn is under firmware control. More particularly, the firmware control signals on lines 95 and 96 are used to control the logic states of the J and K inputs of the J/K flip-flops 55, 59 and 63 prior to the occurrence of each clock pulse on line 92. The logic states of the flip-flops thereby may be controlled to indicate those of registers 11-14 which shall be read for input to the control bus 24 and the logic unit 21 during a next occurring read cycle.

The multiplexer 64 is enabled under firmware control only if a computer instruction or procedural information is to be read from registers 11-14. The firmware control system uses the line 95 to distinguish between a single register selection and a register pair selection. If line 95 is at a logic one level, the multiplexer 64 selects the second or lower inputs of each stage of the multiplexer. Upon the next occurrence of a clock pulse on line 92, flip-flops 55 and 59 change logic states while the flip-flop 63 remains in a same logic state to indicate a register pair selection. If line 95 transitions to a logic zero level, the multiplexer 64 selects the first or upper inputs. Upon the next occurrence of a clock pulse on line 92, the flip-flop 63 and either flip-flop 55 or flip-flop 59 change logic states to indicate a single register selection.

If a next sixteen bit digital word is to be read from the register 11, the Q output of flip-flop 55 shall be at a logic zero level to enable register 11. If the digital word is to be forwarded to the logic unit 21, the Q output of flip-flop 63 shall be at a logic zero level to cause the multiplexer 20 to select the tristate bus 56. Since the logic unit 21 is sixteen bits wide, only single sixteen bit word transfers are made to the logic unit.

If the word stored in register 11 is the first word of a double word being read for output on control bus 24, the other register selected is the register 13. The Q output of flip-flop 59 thus is at a logic zero level to enable the output of register 13. Thereafter, the Q output of flip-flop 55 is transitioned to a logic one level to enable the output of register 12.

In summary, if a next word is to be read from register 11, the Q output of the flip-flops 55, 59, and 63 shall be at a logic zero level. If a next word is to be read from register 12, the Q outputs of flip-flop 55 and 59 shall be at a logic one level, and the Q output of flip-flop 63 shall be at a logic zero level. If register 13 is to be selected next, the Q output of flip-flop 59 shall be at a logic zero level, and the Q outputs of flip-flops 55 and 63 shall be at a logic one level. If a next word is to be read from register 14, the Q output of flip-flop 55 shall be at a logic zero level, and the Q output of flip-flops 59 and 63 shall be at a logic one level.

In the preferred embodiment disclosed herein, CPU instructions are provided to the CPU by way of multiplexer 20 and logic unit 21.

As before stated in part, the bit 0-7 outputs of multiplexer 20 are applied to the tristate bus 100 leading to the input of register 66 of the F-register logic unit 21. The bit 8-15 outputs of the multiplexer are applied to the tristate bus 67. The bit 8 output of multiplexer 20 is connected by way of bus 67 to the bit 24 output of AS register 22 and to the D input of flip-flop 70. In like manner, the bit 9-11 outputs of multiplexer 20 are connected to the bit 25-27 outputs of register 22 and to first inputs of counter 68. The most significant bit of the four-bit data input to counter 68 is supplied by the firmware control system on line 79. The bit 12-15 outputs of multiplexer 20 are connected by way of bus 67 to the bit 28-31 outputs of register 22 and to a four-bit data input of counter 69.

When a sixteen-bit instruction word is to be provided to the CPU, register 66 captures bits 0-7 of the instruction, flip-flop 70 captures bit 8 of the instruction, counter 68 captures bits 9-11 of the instruction, and counter 69 captures the least significant bits 12-15.

The logic unit 21 is loaded under firmware control prior to the execution of each instruction. The counters 68 and 69 thereafter are triggered in response to a clock signal appearing on lines 77 and 82, respectively. The clock signal is aperiodic but synchronized to the initialization of each firmware step. In addition, counter 69 may be loaded under firmware control during the execution of an instruction to provide iteration and other sequencing control counts.

The most significant eight bits of an instruction are decoded by the firmware control system during the execution of an instruction. For this purpose, the firmware control system continuously monitors the bus 100. In order to free the registers 11-14 for further instruction and procedural information, the bus 100 is combined with the bidirectional tristate feedback bus 101 to accommodate repeated decodes of parts of a same instruction word. More particularly, if mid-instruction execution reloads are required, the bus 101 is used to reload register 66 with the same instruction bits while new information is being loaded into the remaining devices comprising the logic unit 21. The bus 101 further is used to overcome timing limitations which occur because of a variance in delays between the time information is presented by the multiplexer 20 to the register 66, the time the register is loaded with such information, and the time the output of the register is enabled to forward the information to the CPU. The bus 101 allows information from multiplexer 20 to be applied to bus 72 at the same time such information is presented to the register 66.

The AS register 22 provides an information path from the W bus 26, the main output data bus of the CPU, to the tristate bus 67. A means for supplying computed variables to the counters 68 and 69 thereby is provided for use as necessary in controlling the execution of specialized algorithms.

When non-instruction procedural information is to be provided to the bus 24, the flip-flops 63 and 102 act in concert with EXCLUSIVE OR gates 97 and 98 to control the operation of the multiplexer 19. More particularly, if a single word is to be provided to the bus 24, the line 99 is at a logic zero level. When the signal on line 92 triggers the flip-flop 102, the Q output of the flip-flop 102 transitions to the same logic state as the Q output of flip-flop 63.

If a double word is to be read from the registers 11-14 and supplied to the bus 24, the line 99 is at a logic one level. When the signal on line 92 triggers the flip-flop 102, the Q output of the flip-flop transitions to the same logic state as the Q complement output of flip-flop 63.

The above-described operation acts under firmware control to cause the multiplexer 19 to select both buses 56 and 60 during a double word read cycle, or any one of the two buses during a single word read cycle. More specifically, the Q output of the flip-flop 102 is made to track the logic state of the Q output of flip-flop 63 during single word transfers. During double word transfers to bus 24, the Q output of flip-flop 102 is made to track the logic state of the Q complement output of flip-flop 63. A first word thereby is provided to the more significant end of the bus 24 while a second word is transferred to the less significant portion of the bus.

The logic control system of FIG. 2 accommodates both the execution speeds of the CPU and the memory system bandwidth by synchronizing requests to memory for additional instruction and procedural information with the Q output of flip-flop 63. More particularly, flip-flop 110, AND gate 106 and OR gate 108 act in concert with flip-flop 63 to request information from the memory system. If a single computer word is to be requested, the firmware control system causes the line 107 to transition to a logic one level. If the Q output of flip-flop 63 is at a logic zero level, gate 106 is enabled to cause the output of gate 108 to transition to a logic one level. Upon the next occurrence of a clock pulse on line 111, the Q output of flip-flop 110 transitions to a logic one level to request additional information from the memory system. When the request is accepted, the firmware control system causes line 112 to transition to a logic one level to reset the flip-flop 110. If the Q output of flip-flop 63 is at a logic one level when line 107 transitions to a logic one level, however, the Q output of flip-flop 110 remains at a logic zero level and no request for additional information is sent to the memory system.

In the event a double computer word is to be requested from the memory system, the firmware control system transitions line 109 to a logic one state to cause the output of gate 108 to transition to a logic one state. Upon the next occurrence of a clock pulse on line 111, the Q output of the flip-flop 110 transitions to a logic one level as before described.

The logic control system as disclosed herein effects a loading of selected ones of registers 11-14 from register 10, and a reloading of register 10 from memory at the beginning of an access of remaining ones of registers 11-14 by the CPU. By way of example, if the CPU accesses register 11, a request for additional information from memory to be loaded into register 10 is issued by flip-flop 110, and registers 12 and 14 are loaded from register 10 at the beginning of the firmware step in which the CPU accesses the register 11. In this manner, the logic control system is two words ahead of the CPU if the CPU is reading a single word from register 11, and one word ahead if the CPU is reading a double word from registers 11 and 13.

In the logic control system of FIG. 2, it is to be understood that the flow of information from the local communication bus through the register 10 and into registers 11-14 is synchronized by the firmware control system to the timing of the local communication bus 23. The flow of the information from the registers 11-14 through the multiplexers 19 and 20, onto the bus 24 and into the logic unit 21 is synchronized by the firmware control system to the clock signals appearing on lines 71, 75, 77, 82 and 92. The clock signals on lines 71 and 75 are in phase with the clock signal on line 92. The clock signals on lines 77 and 82, however, are one-hundred-eighty degrees out of phase with the clock signal on line 92. A clock pulse comprising the clock signal of line 92 is issued at the beginning of each firmware step. The occurrence of clock pulses in each of these clock signals, therefore, is aperiodic but synchronized to the initialization of each firmware step. In the event a branch instruction is executed by the firmware control system, the logic control system of FIG. 2 is again initialized by the occurrence of a logic one signal on line 93 as before stated, and the timing of the system continues as described above.

Figure 3:
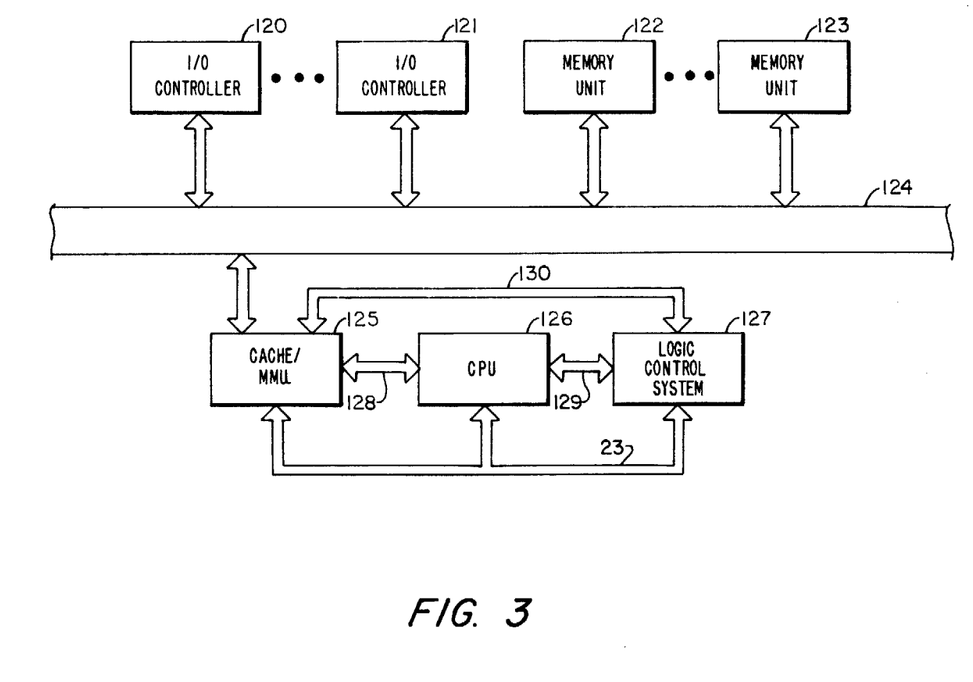
FIG. 3 is a functional block diagram of a data processing system embodying the invention.

FIG. 3

FIG. 3 illustrates in functional block diagram form the bus structure of a processing system which contributes to the improvement in performance afforded by the present invention.

Referring to FIG. 3, I/O controllers 120-121 and memory units 122-123 each communicate with the other units by way of a common system bus 124. A cache memory/memory management unit 125 is in electrical communication with bus 124, and further is in electrical communication by way of local communication bus 23 with a CPU 126 and a logic control system 127 in accordance with the present invention. The CPU 126 and the logic control system 127 communicate with the common system bus 124 by way of the cache unit 125.

The function of the cache unit is to provide a buffer storage of a current portion of main memory as stored in memory units 122-123 which is being used by the CPU, and to provide for the translation of main memory addresses. When the logic control system 127 in response to a CPU command requests information from main memory, the request is intercepted and honored by the cache unit 125 if the requested information is stored in the cache unit. Otherwise, the information shall be provided by main memory. In all information transfers from main memory, the information is supplied both to the cache unit 125 and to the local communication bus.

The CPU 126 further communicates by way of a dedicated bus 128 with the cache unit 125, and by way of a dedicated bus 129 with the logic control system 127. Further, the logic control system 127 communicates by way of a dedicated bus 130 with the cache unit 125.

In the computer environment illustrated in FIG. 3, average memory transfer cycle time periods of minicomputers such as, by way of example, Honeywell Level 6 computers have been reduced on the order of 50 percent by having the logic control system 127 rather than the CPU interface with the system bus 124. The CPU messages are thereby confined to the buses 23, 128 and 129 which have faster bus cycle rates and incur less transfer delays because of shorter lengths and fewer loads. If as an example the average cycle time of a system in which CPU 126 interfaces directly with the system bus 124 is of the order of 1000 nanoseconds, the use of a system such as the logic control system 127 to interface between the CPU and the system bus 124 in accessing the main memory shall effect a reduction in transfer cycle times of the order of 500 nanoseconds. If the logic control system 127 is used in conjunction with cache unit 125 in accordance with the present invention as illustrated in FIG. 3, the average transfer cycle times may be further reduced to the order of 200 nanoseconds.

In accordance with the invention, there is provided a flexible hardware/firmware control system for accommodating the transfer of single and double words of procedural information and CPU instructions from central memory to a CPU at transfer rates sufficiently high to avoid any compromise of memory bandwidths or CPU execution speeds caused by transfer delays. The logic control system includes a decoding logic system which overcomes timing variances in transferring instructions to a CPU, and which is structured to accommodate continued access to the operation code of an instruction without interfering with the use of operand bits for other purposes. Further, incrementation, decrementation, and the substitution of either stored value or computed values in the operand bits of an instruction are accommodated during instruction execution.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A hardware/firmware logic control subsystem in a data processing system, said data processing system including a central memory subsystem, and a central processing unit (CPU) having a firmware control subsystem, said firmware control subsystem being in electrical communication with said logic control subsystem by way of a local communication bus, said logic control subsystem which comprises:
   (a) first register means responsive to a plurality of signals from said firmware control subsystem for receiving from said central memory subsystem binary information including CPU instruction words and procedure words;
   (b) plural register means including a plurality of registers in electrical communication with said first register means, said plurality of registers being responsive to a plurality of clock signals for storing single words received during one cycle of operation and double words received during another cycle of operation from said first register means, said plurality of registers being responsive to a plurality of output-enable signals for reading out selected ones of said plurality of registers by said CPU;
   (c) multiplexer means in electrical communication with said CPU and responsive to said plurality of signals from said firmware control subsystem and to selection control signals for receiving said binary information representative of said procedure words from selected ones of said plurality of registers for transfer to said CPU;

(d) logic selection control means responsive to said plurality of signals from said firmware control subsystem for issuing at the beginning of an access of said plurality of registers by said CPU information requests to said central memory subsystem, said output-enable signals, said selection control signals to said multiplexer means, and said plurality of clock signals for loading said selected ones of said plurality of registers with said binary information from said first register means while accommodating the selectable accessing of remaining ones of said plurality of registers by said multiplexer means; and (e) instruction decoding means in electrical communication with said multiplexer means and said CPU, and responsive to said plurality of signals from said firmware control subsystem for storing said CPU instruction words received from said plurality of registers, said CPU instruction words including a first field and a second field and accommodating the modification of said CPU instruction words during instruction execution by substituting computed binary codes received from said CPU for said first field, while providing a continued access to said second field of said CPU instruction words by said firmware control subsystem without compromising the information transfer rate from said plurality of registers through said multiplexer means and said instruction decoding means to said CPU.

2. A hardware/firmware logic control subsystem in a data processing system, said data processing system including a central memory subsystem, a cache memory subsystem in electrical communication with said central memory subsystem by way of a system communication bus, and a central processing unit (CPU) having a firmware control subsystem, said firmware control subsystem being in electrical communication with said logic control subsystem and said cache memory subsystem by way of a local communication bus, said logic control subsystem which comprises:

(a) first register means in electrical communication with said local communication bus and responsive to a plurality of signals from said firmware control subsystem for receiving from said cache memory subsystem binary information including CPU instruction words and procedure words stored in said cache memory subsystem or said central memory subsystem;

(b) plural register means including a plurality of registers in electrical communication with said first register means, said plurality of registers being responsive to a plurality of clock signals for storing single words received during one cycle of operation and double words received during another cycle of operation from said first register means, said plurality of registers being responsive to a plurality of output-enable signals for reading out selected ones of said plurality of registers by said CPU;

(c) multiplexer means in electrical communication with said CPU and responsive to said plurality of signals from said firmware control subsystem and to selection control signals for receiving said binary information representative of said procedure words from selected ones of said plurality of registers for transfer to said CPU;

(d) logic selection control means responsive to said plurality of signals from said firmware control subsystem for issuing at the beginning of an access of said plurality of registers by said CPU information requests to said central memory subsystem by way of said cache memory subsystem, said output-enable signals, said selection control signals to said multiplexer means, and said plurality of clock signals for loading said selected ones of said plurality of registers with said binary information from said first register means while accommodating the selectable accessing of remaining ones of said plurality of registers by said multiplexer means; and (e) instruction decoding means in electrical communication with said multiplexer means and said CPU, and responsive to said plurality of signals from said firmware control subsystem for storing said CPU instruction words received from said plurality of registers, said instruction decoding means being further responsive to said plurality of signals from said firmware control subsystem for providing a continued access to first fields of said CPU instruction words while accommodating the modification of second fields of said binary CPU instruction words during instruction execution by substituting in said second fields computed binary codes received from said CPU or stored binary codes received from either said cache memory system or said central memory system by way of said cache memory system, and by incrementing or decrementing said second field, without compromising the information transfer rates from said plurality of registers through said multiplexer means and said instruction decoding means to said CPU.

3. A hardware/firmware logic control subsystem in a data processing system, said data processing system including a central memory subsystem, a cache memory subsystem, and a central processing unit having a firmware control subsystem, said logic control subsystem which comprises:

(a) a system communication bus in electrical communication with said central memory subsystem;

(b) a local communication bus in electrical communication with said cache memory subsystem and said CPU;

(c) first register means responsive to a plurality of signals from said firmware control subsystem and in electrical communication with said local communication bus for receiving said binary information including both binary CPU instruction words and binary procedural words stored in either said central memory subsystem or said cache memory subsystem;

(d) plural register means including a plurality of registers in electrical communication with said first register means, said plurality of registers being responsive to a plurality of output-enable signals and a plurality of clock signals for storing single words received during one cycle of operation and double words received during another cycle of operation from said first register means;

(e) multiplexer means responsive to said plurality of signals from said firmware control subsystem and to selection control signals for receiving from selected ones of said plurality of registers said binary CPU instruction words and said binary procedural words singularly or in pairs, for transfer of said procedural words directly to said CPU;

(f) logic selection conrol means responsive to said plurality of signals from said firmware control subsystem for issuing information requests to said central memory subsystem by way of said cache memory subsystem, said plurality of clock signals, said output-enable signals of said plurality of registers, and said selection control signals to said multiplexer means at the beginning of an access of said plurality of registers by said CPU for loading said selected ones of said plurality of registers with said binary CPU instruction words and said binary procedural words from said first register means while accommodating the accessing of remaining ones of said plurality of registers by said multiplexer means for transfer to said CPU; and (g) decoding logic means in electrical communication with said multiplexer means and said CPU, and receiving under the control of said plurality of signals from said firmware control subsystem said CPU instruction words from said multiplexer means, and further selectively receiving under the control of said plurality of signals from said firmware control subsystem either computed values from said CPU or memory values from said plurality of registers by way of said multiplexer means to effect the modification of first bit fields of said binary CPU instruction words during the accessing and use of said binary CPU instruction words by said CPU, and having a bidirectional information path for reloading first bit fields of said binary CPU instruction words into said decoding logic means as remaining bit fields of said binary CPU instruction words are being modified, and further providing said first bit fields to said CPU upon receipt without incurring time delays internal to said decoding logic means.

4. A hardware/firmware logic control subsystem in a data processing system, said data processing system including a central memory subsystem, a cache memory subsystem and a central processing unit (CPU) having a firmware control subsystem, said logic control subsystem which comprises:

(a) a system communication bus in electrical communication with said central memory subsystem;

(b) a local communication bus in electrical communication with said cache memory subsystem and said CPU;

(c) first register means responsive to said plurality of signals from said firmware control subsystem for receiving by way of said cache memory subsystem both binary CPU instruction words and binary procedural words stored in said central memory subsystem;

(d) plural register means including a plurality of registers in electrical communication with said first register means, said plurality of registers being responsive to a plurality of output-enable signals and a plurality of clock signals for storing single words received during one cycle of operation and double words received during another cycle of operation from said first register means;

(e) multiplexer means responsive to said plurality of signals from said firmware control subsystem and to selection control signals for receiving from selected ones of said plurality of registers said binary CPU instruction words and said binary procedural words singularly or in pairs for transfer of said binary procedural words to said CPU;

(f) logic selection control means responsive to said plurality of signals from said firmware control subsystem for issuing information requests to said central memory subsystem by way of said cache memory subsystem, said plurality of clock signals, said output-enable signals of said plurality of registers, and said selection control signals to said multiplexer means at the beginning of an access of said plurality of registers by said CPU for loading said selected ones of said plurality of registers with said binary CPU instruction words and said binary procedural words from said first register means while accommodating the accessing of remaining ones of said plurality of registers by said multiplexer means;

(g) first decoding logic means in electrical communication with said multiplexer means and said CPU, and receiving under the control of said plurality of signals from said firmware control subsystem binary operation codes of said binary CPU instruction words from said multiplexer means, and having both a feedback information path for reloading said operation codes into said first decoding logic means and providing a continuous access to said operation codes by said plurality of signals from said firmware control subsystem, and a feedforward information path for providing said operation codes to said CPU immediately upon receipt without incurring time delays internal to said first decoding logic means;

(h) second decoding logic means in electrical communication with said CPU for receiving from said CPU under control of said plurality of signals from said firmware control subsystem computed values for modifying operand fields of said binary CPU instruction words; and (i) third decoding logic means in electrical communication with said second decoding logic means and receiving said operand fields from said multiplexer means under the control of said plurality of signals from said firmware control subsystem, and responsive to said plurality of signals from said firmware control subsystem for selectively modifying said operand fields during the execution of said CPU instruction words by receiving stored values from said plurality of registers by way of said multiplexer means, by receiving said computed values from said second decoding logic means, or by incrementing or decrementing said operand fields.

* * * * *